Nov. 3, 1953     C. W. KLOSTERMANN ET AL     2,658,183
HERMETICALLY SEALED SOCKET WITH FREELY FLOATING CONTACTS
Filed March 13, 1950
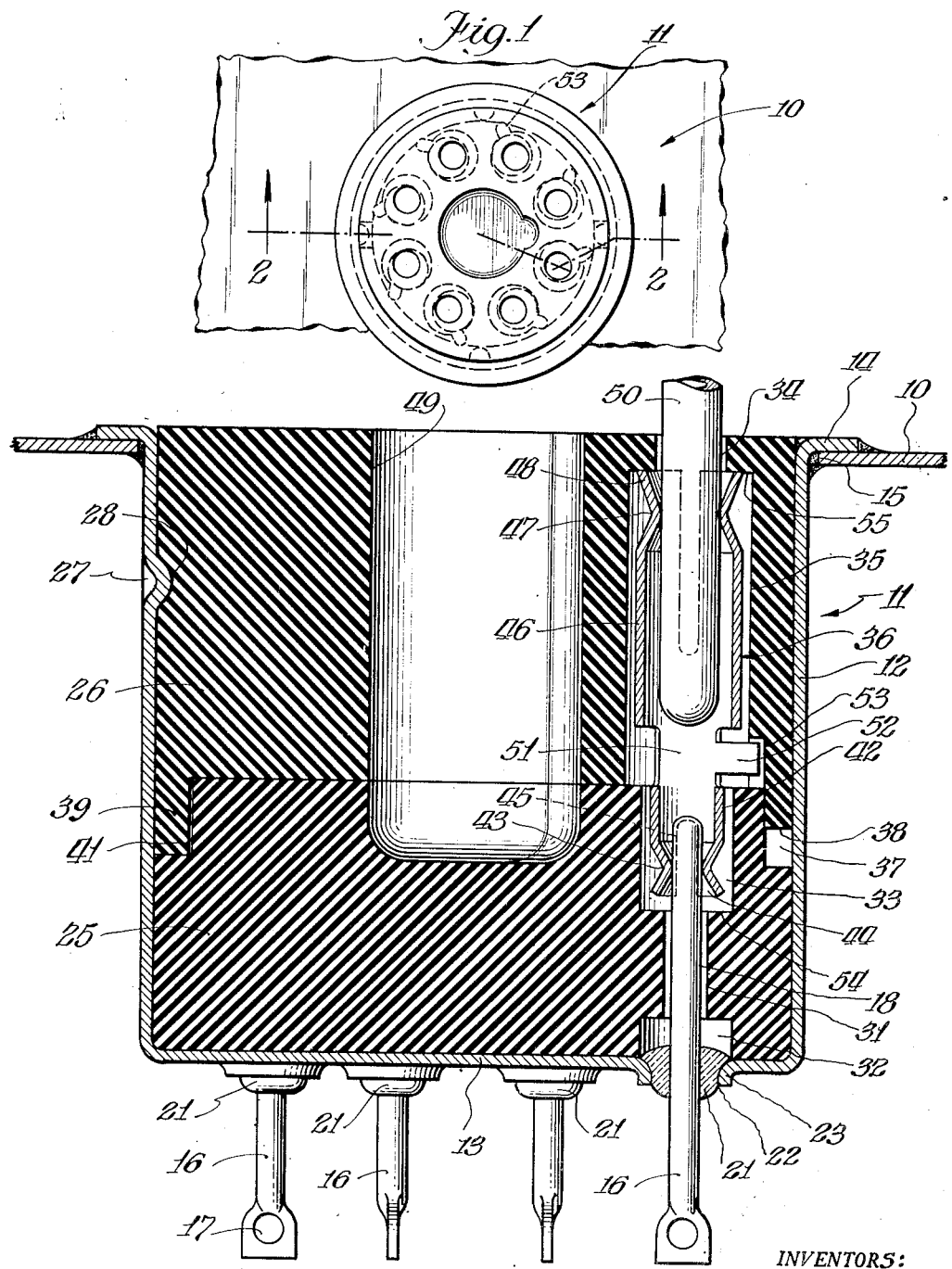
INVENTORS:
Curt W. Klostermann
Charles J. Adams
By: L. F. Hammand
Attorney.

Patented Nov. 3, 1953

2,658,183

UNITED STATES PATENT OFFICE 2,658,183

HERMETICALLY SEALED SOCKET WITH FREELY FLOATING CONTACTS

Curt W. Klostermann, Chicago, and Charles J. Adams, Park Ridge, Ill., assignors to American Phenolic Corporation, Chicago, Ill., a corporation of Illinois Application March 13, 1950, Serial No. 149,292

2 Claims. (Cl. 339—64)

The present invention relates to electronic tube sockets and similar electrical connectors, and has particular reference to an electronic tube socket suited for use with hermetically sealed equipment.

It is well known that certain types of electronic equipment, particularly military equipment intended for operation in areas of extremely adverse climatic conditions, should be hermetically sealed in order to exclude air from the housing in which the equipment is mounted, and, consequently, to prevent condensation of moisture and the formation of fungus growths which would otherwise soon interfere with the proper operation of the equipment. It is nevertheless necessary, however, that the electronic tubes themselves be outside of the sealed housing, since these tubes must be replaced from time to time, as it is important to be able to replace the tubes without destroying the seal around the rest of the equipment. This poses a difficult problem of electrical design, since it is entirely impractical to attempt to seal the conventional type of electronic tube socket, and it has been found equally impractical to utilize satisfactory hermetic sealing devices in such a manner as to establish electrical connections with a conventional socket outside of the sealed chassis of the equipment.

One of the most satisfactory forms of hermetically sealed conductors thus far developed comprises a short metallic pin which extends through a small glass bead fused in a flanged aperture of a sheet metal wall. The bead is bonded both to the wall and to the pin, so that the bead is the sole mechanical support of the pin, which serves as an electrical conductor entering through the wall. These fused glass seals have shown themselves to be highly efficient from an electrical standpoint, but have the recognized shortcoming that they are extremely fragile mechanically and are easily subject to fracture if subjected to any appreciable force, particularly to any force acting laterally with respect to the individual pins. For this reason, they have heretofore been regarded as unsuited to utilization as contact members in electronic tube sockets, since these are often subjected to considerable vibration and to severe impacts. In addition to this, however, and probably more important, is the fact that it is a recognized essential that some lateral play and movement of the socket contacts must be possible in order to compensate for tolerance variations in the spacings of the tube pins. It has accordingly been regarded as utterly impractical to attempt to employ hermetic seals of the glass bead type to establish connection from within a sealed chassis to a tube socket carried in the chassis wall.

It is the primary object of the present invention to provide an electronic tube socket for hermetically sealed equipment, wherein a perfect hermetic seal is maintained, yet the socket is nevertheless capable of accommodating tubes having their pins imperfectly spaced, and to establish proper electrical connection with tubes having oversize pins, which also impose abnormal strains on the socket contacts. This is done, according to the present teaching, by employing a socket body and free floating contacts of novel design, which coact to permit considerable lateral movement of the pin contacts within the socket, as well as to accommodate oversized or undersized pins, yet to absorb lateral stresses set up by imperfect pin spacing and to adequately resist the abnormal inward and outward thrusts exerted by oversize pins, so that such tubes may be inserted in or removed from the socket without damaging the fragile sealing devices. To this end the present invention contemplates the use of a socket having an airtight metal sealing wall employing a plurality of glass bead seals having center pins to establish electrical connection through the wall, together with an insulating socket body into which the pins of the seals extend. The socket body is provided with a plurality of independent socket contacts, each of which is mounted in what may be termed a "freely floating" manner, so that it is confined, yet free to shift a limited amount in any direction. These socket contacts have oppositely disposed friction sleeves to engage the pins of the seals at one end and the tube pins at the other, so that the individual contacts may freely position themselves according to the pin spacing of the tube inserted into the socket, in such a manner that they will establish an efficient electrical connection between the pins of a tube inserted in the socket and the pins of the hermetic seals extending through the sealing wall, yet will impose no physical strains on the seals.

The present preferred embodiment of the invention is illustrated in the drawings of this specification, wherein:

Figure 1 is a plan view of a socket constructed in accordance with these teachings; and Figure 2 is an enlarged sectional view taken substantially on the plane of the line 2—2 of Figure 1.

The socket is illustrated as attached to a thin sheet metal wall 10, which represents the exterior wall of a hermetically sealed chassis in which electronic equipment associated with the socket is housed. The socket itself, generally designated by the ordinal 11, includes a cylindrical sheet metal shell or cup 12 having a relatively flat bottom portion 13 at its lower end and an outwardly extending mounting flange 14 at its upper end. The mounting flange of the socket is soldered in an aperture 15 in the wall 10, so that the shell acts as a sealing member which coacts with the wall to form an airtight partition providing an effective hermetic seal for the equipment within the chassis.

The electrical connections from the inside of the chassis to the socket are established through one or more conductors 16 extending through apertures in the lower plate 13 of the socket. As illustrated, these conductors 16 consist of slender metal pins provided with terminal eyelets 17 at their outer end and have straight shank portions 18 projecting upwardly into the socket shell 12. These conducting pins are bonded to glass insulating beads 21, which are in turn mounted and sealed in the contact apertures 22 of the socket. As shown, these beads are fused directly to the downwardly extending flanges 23 of these apertures.

The socket body is of insulating material and, as illustrated, consists of a lower dielectric insert 25 molded to fit in the bottom of the metallic shell 12, and an upper dielectric insert 26 shaped to be received in the shell above the insert 25, so that both of the inserts may be permanently held in assembled relationship with the shell by a plurality of crimps 27 wherein the metal of the shell wall 12 is deformed into recesses 28 molded on the exterior surface of the upper dielectric insert 26. The lower insert 25 is pierced with an aperture corresponding to the position of each of the conductor pins 16, so that each of these pins projects upwardly into an individual aperture of the insert. These apertures are preferably of sufficiently large diameter to give ample clearance around each of the pins, so that the pins stand free of the insulating material and are supported solely by the glass beads 21. The openings 31 may include enlarged portions 32 at their lower end to afford adequate clearance around each of the insulating beads, and enlarged portions 33 at their upper ends, to form a part of an enlarged cavity.

The upper dielectric insert 26 has pin apertures 34 corresponding in position to the positions of the pins 16 but slightly offset therefrom, and each of these pin apertures enters an enlarged gravity 35 which coacts with the enlarged portion 33 of the cavity in the lower insert to receive a metallic contact generally designated by the numeral 36. The cavities 33 and 35 may be concentric if desired, but in the form of the invention illustrated, their centers are slightly offset from each other, so that although the cavities 35 are somewhat larger than the cavities 33, their side walls may be substantially parallel along one side (see Figure 1). To this end, the upper and lower inserts 25 and 26 are keyed to each other by a key portion 37 extending into a keyway 38 in the flange 39, which surrounds a reduced upper end portion 41 of the insert 25. The enlarged portions 33 and 35 of each of the insert cavities coact to house a contact 36, which comprises a double ended, free floating spring sleeve. As illustrated, the spring sleeve includes an oversize lower tubular sleeve 42 (of diameter substantially greater than the diameter of the pin shank 18) having a constricted contact point 43 of proper size to receive the upper end of one of the pins 16, and an outwardly flared mouth 44. The sleeve 42 is preferably split along one side for its full length, and may be split on its opposite side as at 45, so that the inherent resiliency of the metal from which it is formed will afford a snug friction fit of the contact point 43 on the exterior surface of the pin. By this arrangement an electrical contact of low resistance is achieved, yet the contact sleeve is free to slide longitudinally along the pin and may move considerably out of axial alignment with the pin without imposing any appreciable strains thereon. The upper end of the contact 36 comprises an oversize spring sleeve 46 having a constricted contact point 47 and an outwardly flared mouth 48 shaped to receive a contact pin of a vacuum tube inserted in the socket. Such a contact pin is represented in the drawings by the pin 50. A keyed central recess 49 is formed in the insert 26 to receive the pilot shank of the tube.

The lower sleeve 42 and upper sleeve 46 of the contact are formed of a single integral piece of sheet metal shaped to include a central section 51 which extends between the two sleeves and which has an outwardly extending key or tab 52 received in a keyway 53 on one side of the enlarged portion 35 of the upper cavity.

On review of the structure illustrated above, it should be clear that a socket constructed in accordance with these teachings provides an adequate hermetic seal of the chassis, since the flange 14 of the metal socket shell is soldered directly to the airtight wall 10 of the chassis. If desired, this soldering may be done before the inserts 25 and 26 are placed in position, so that the inserts are not subjected to the heat of the soldering operation. This makes it feasible to employ low temperature plastic for said inserts if desired. The side walls 12 and bottom 13 of the socket cup form a continuous metal partition interrupted only by the glass seals 21 fused in and bonded to the flanges 23. These seals effect a perfect airtight bond between the metal of the socket shell as well as with the central conductors, and thereby effect a seal which is entirely impervious to air and moisture.

The dielectric inserts 25 and 26 of the socket are of such shape that they need not contact the pins 16 at any time, with the result that these pins are supported solely by the glass beads 21 and are thus protected against any external stresses. It is to be understood, of course, that as tubes are inserted into or removed from the socket, the frictional engagement between the tube pins 50 and the upper spring sleeves 46 of the contacts 36 will cause downward thrusts on the contact as the tubes are inserted into the sockets, and upward thrusts thereon whenever a tube is removed. It is to be noted, however, that these thrusts are not transmitted to the pins 16, since even when a tube having oversize contact pins is inserted in the socket, the abnormal thrust which it imposes on the contact serves only to move the lower end of the contact mouth 44 into abutting engagement with the upwardly disposed shoulder 54 at the bottom of the cavity 33, so that the thrust is received on this insulating shoulder rather than on the pin 16. The force that can be imposed on the pins 16 is thus limited to the degree of frictional engagement between the constricted contact 43 of the sleeve 42 and the cylindrical surface of the shank 18 of the pin. Similarly, any upward thrust developed as a result of the removal of a tube from the socket is not exerted on the pins 16, but is absorbed as the upper end of the mouth portion 48 of the sleeve 46 comes into engagement with the downwardly disposed shoulder 55 of the upper dielectric insert 26 (Figure 2). The key 52 of each of the socket contacts prevents rotational movement of the contacts within their cavities and thus maintains the sleeves 42 in properly centered relationship with the pins 16 and holds the sleeves 46 properly centered below the pin apertures 34. It is to be remembered, however, that it is one of the primary aims of the present invention to prevent damage to the hermetic seal as a result of inserting or attempting to insert into the socket tubes having bent pins or pins otherwise out of proper spacing or alignment with each other. Such tubes may be received in the socket since the apertures 34 are somewhat larger than the contact pins 50, and while any misaligned pin will cause corresponding lateral movement of the contact sleeve 46 in which it is received, this movement will be primarily at the constricted point of contact 47 between the sleeve and the pin, and will serve to tilt the contact in its socket rather than to move it bodily in a lateral direction. Thus the upper end of the contact may move in any lateral direction without imposing any corresponding strains on the pins 16, due to the fact that the contact between the sleeves and these pins is exerted primarily at the constricted point 43, so that the contact may tilt substantially without tending to move the upper end of the pin.

From the above it is believed apparent that by the present teachings it is entirely feasible to employ hermetic sealing devices consisting of a conducting pin extending through a metallic sealing wall and supported therein solely by a fused glass bead, since a socket constructed according to the present teaching prevents any strains incident to the insertion or removal of the tube being transmitted to the pin in such a manner as to cause damage to the seal. The socket is equally effective in resisting strains caused by impacts on the tubes or chassis while in use. This is accomplished, moreover, by a structure that is relatively simple and inexpensive, mechanically strong, and which is well suited to modern mass production methods of manufacture, as well as being of neat, compact appearance and of low loss electrical design.

The exact form of the invention here shown is a preferred embodiment of this teaching, and has been chosen as particularly well suited to an explanation of the principles of the invention, but it will be obvious to those skilled in the art that many modifications and departures from the precise form of the invention here shown may be indulged in, and it is accordingly pointed out that the form of the invention here shown is chosen for purposes of illustration rather than in limitation, and that the scope of the inventive concept extends to any modifications or variations thereof within the terms of the appended claims.

Having thus described our invention, what we claim as new and desire to protect by United States Letters Patent is:

1. A hermetically sealed socket comprising, in combination, an airtight sealing member consisting of a relatively thin metal cup having a bottom wall, side walls, and a marginal mounting flange; at least one contact aperture in said bottom wall, with a conductor comprising a metallic pin extending through said aperture and projecting upwardly into said cup; an insulating seal surrounding said pin bonded to the surface of the pin and sealed to the bottom wall of the metal cup, so that the insulating seal supports said pin; together with a socket body comprising a bottom section and a top section, said bottom section having an aperture in alignment with said contact pin and of greater diameter than said pin so that the pin extends through said aperture of the body but is spaced therefrom at all points, at least one pin aperture in the top section of the socket body in substantial alignment with said aperture in the bottom section thereof, together with an enlarged contact cavity between said apertures, said cavity having oppositely disposed shoulders to retain a metal contact therein; a free floating metal contact member confined within said cavity and comprising an upper spring sleeve disposed at a contact pin aperture of the top section and a lower spring sleeve in frictional engagement with the upwardly projecting portion of said metallic conductor pin.

2. A hermetically sealed socket comprising, in combination, an airtight sealing member consisting of a relatively thin metal partition having at least one contact aperture therein, with a flange integral with the sealing member surrounding said aperture, a conductor comprising a metallic pin extending through said aperture, and a glass bead surrounding said pin; said bead being bonded to the surface of the pin and sealed to the sealing member respectively; together with a socket body comprising a bottom section and a top section, said bottom section having an aperture in alignment with said contact pin, at least one pin aperture in the top section of the socket body in substantial alignment with an aperture in the bottom section thereof, together with an enlarged contact cavity between said apertures, said cavity having oppositely disposed shoulders to retain a metal contact therein; and a free floating metal contact member confined within said cavity and comprising an upper spring sleeve disposed at a contact pin aperture of the top section and a lower spring portion in frictional engagement with a contact pin extending through the metal partition of the sealing member.

CURT W. KLOSTERMANN.
CHARLES J. ADAMS.

References Cited in the file of this patent

UNITED STATES PATENTS

| Number | Name | Date |
|---|---|---|
| 2,292,863 | Beggs | Aug. 11, 1942 |
| 2,431,583 | Penfold | Nov. 25, 1947 |
| 2,438,371 | Marholz | Mar. 23, 1948 |
| 2,440,279 | Larkins, Jr. | Apr. 27, 1948 |
| 2,444,048 | Keller | June 29, 1948 |
| 2,451,800 | Buchanan et al. | Oct. 19, 1948 |
| 2,472,131 | Toth et al. | June 7, 1949 |
| 2,529,502 | Kelly et al. | Nov. 14, 1950 |
| 2,603,681 | Salisbury | July 15, 1952 |

FOREIGN PATENTS

| Number | Country | Date |
|---|---|---|
| 620,804 | Great Britain | Mar. 30, 1949 |